L. W. TRUESDELL.
Milk-Coolers.
No. 205,155. Patented June 18, 1878.
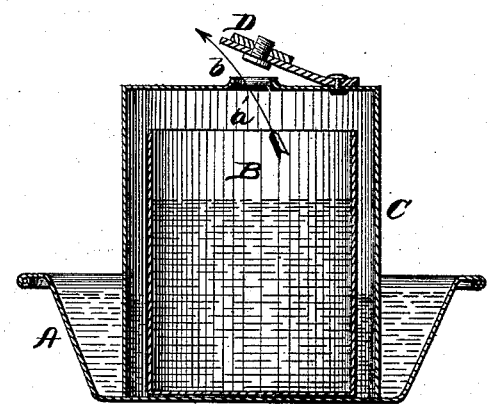

UNITED STATES PATENT OFFICE.

LEWIS W. TRUESDELL, OF OWEGO, NEW YORK, ASSIGNOR TO D. F. STEELE AND A. D. HOOGLAND, OF SAME PLACE.

IMPROVEMENT IN MILK-COOLERS.

Specification forming part of Letters Patent No. 205,155, dated June 18, 1878; application filed March 12, 1878.

*To all whom it may concern:*

Be it known that I, LEWIS W. TRUESDELL, of Owego, in the county of Tioga and in the State of New York, have invented certain new and useful Improvements in Valve-Sealing Milk-Can Covers; and do hereby declare that the following is a full, clear, and exact description thereof, reference being had to the accompanying drawing, and to the letters of reference marked thereon, making a part of this specification.

My invention has for its object to cool milk and keep it from being exposed to the atmosphere; and the nature of my invention consists in placing the can of milk in water, and then passing a cover over said can, which cover shall extend down into the water, and is provided at its top with an automatic valve for the escape of the animal heat, and which valve closes and seals itself, all as hereinafter more fully set forth.

In order to enable others skilled in the art to which my invention appertains to make and use the same, I will now proceed to describe its construction and operation, referring to the annexed drawing, which represents a central vertical section of my invention.

A represents a pan, of any suitable dimensions, on the bottom of which a milk-pan, B, is placed, the pan being filled, or nearly filled, with water.

C represents the cover, which is made in suitable form to pass over the can B and have its edges down into the water, the same resting on the bottom of the pan.

It is evident, however, that the pan A is not absolutely necessary. The milk-can and cover can equally as well be placed in the troughs and sinks usually made in spring-houses, dairies, &c.

In the top of the cover C is made an aperture, $a$, with a flange, $b$, extending upward around the same, and on this flange rests a valve, F, which is fastened to one side on the cover and opens upward.

This milk-can cover requires no weight to keep it in place. The valve is automatic in its action, opening to allow the animal heat to pass off; and as the heat condenses it sucks the valve tight, thereby hermetically sealing the cover. When the valve is open and the animal heat is passing off no odor or dust can enter.

I do not claim a series of milk-cans placed in a reservoir containing water, which is provided with an opening covered with wire-gauze; neither do I broadly claim water-sealing milk within the vessel containing it nor submerging such vessel in water; nor do I broadly claim a bottomless cup having a valve at its top when such is used in connection with a pipe to allow gases to pass away from a refrigerator.

Having thus fully described my invention, what I claim as new, and desire to secure by Letters Patent, is—

The cover C, constructed as described, and provided with the automatically-acting valve D at its top, closing against an annular upwardly-projecting flange, $b$, in combination with the milk-can B and water-pan A, substantially as and for the purposes set forth.

In testimony that I claim the foregoing I have hereunto set my hand this 2d day of March, 1878.

LEWIS W. TRUESDELL.

Witnesses:
ALEXANDER D. HOOGLAND,
DON F. STEELE.